United States Patent
Adams et al.

(10) Patent No.: US 12,472,957 B1
(45) Date of Patent: Nov. 18, 2025

(54) COMPUTATIONAL FRAMEWORK FOR AUTOMATIC HIGH ASSURANCE SYSTEM DESIGN

(71) Applicant: Zoox, Inc., Foster City, CA (US)

(72) Inventors: Derek Adams, Pasadena, CA (US); Daniel Miller, Dallas, TX (US)

(73) Assignee: Zoox, Inc., Foster City, CA (US)

( * ) Notice: Subject to any disclaimer, the term of this patent is extended or adjusted under 35 U.S.C. 154(b) by 1002 days.

(21) Appl. No.: 17/514,614

(22) Filed: Oct. 29, 2021

(51) Int. Cl.
*B60W 50/02* (2012.01)
*B60W 40/02* (2006.01)
*B60W 50/029* (2012.01)
*G06F 30/20* (2020.01)
*G06N 3/126* (2023.01)
*G06N 7/01* (2023.01)

(52) U.S. Cl.
CPC ........ *B60W 50/0205* (2013.01); *B60W 40/02* (2013.01); *B60W 50/029* (2013.01); *G06F 30/20* (2020.01); *G06N 3/126* (2013.01); *G06N 7/01* (2023.01); *B60W 2050/021* (2013.01); *B60W 2720/30* (2013.01)

(58) Field of Classification Search
CPC .... G06F 30/00; G06F 30/20; B60W 50/0205; B60W 40/02; B60W 2050/021; B60W 2720/30; B60W 50/029; G06N 3/126; G06N 7/01
USPC ........................................................ 703/13
See application file for complete search history.

(56) References Cited

U.S. PATENT DOCUMENTS

| | | | |
|---|---|---|---|
| 9,792,656 B1 | 10/2017 | Konrardy et al. | |
| 10,012,993 B1 | 7/2018 | Matus et al. | |
| 10,397,019 B2 | 8/2019 | Hartung et al. | |
| 11,741,274 B1* | 8/2023 | Crego | G06N 3/047 |
| | | | 703/8 |
| 2019/0138000 A1* | 5/2019 | Hammond | B60W 50/0205 |
| 2020/0166933 A1 | 5/2020 | Höfig | |
| 2022/0005291 A1 | 1/2022 | Konrardy et al. | |
| 2022/0118991 A1* | 4/2022 | Chen | B60W 50/038 |
| 2023/0192139 A1 | 6/2023 | Kumavat et al. | |

OTHER PUBLICATIONS

Non-Office Action for related U.S. Appl. No. 18/139,758, dated Apr. 15, 2025, 5 Pages.

* cited by examiner

*Primary Examiner* — Cedric Johnson
(74) *Attorney, Agent, or Firm* — Lee & Hayes, P.C.

(57) ABSTRACT

Techniques for efficiently generating systems are disclosed herein. Abstract system definitions can define the various functions of a system and/or the fitness requirements of the system. Components capable of implementing the aspects of the abstract system can be determined and systems configured to perform the functions of the abstract system are determined. The fitness of these systems can be evaluated to determine whether they meet the fitness requirements of the abstract system. If not, an algorithm is used to iteratively adjust the configurations and components of the systems until the fitness criteria is met.

20 Claims, 5 Drawing Sheets

COMPUTATIONAL FRAMEWORK FOR AUTOMATIC HIGH ASSURANCE SYSTEM DESIGN

BACKGROUND

Autonomous vehicles are configured with a large number of physical and software components, many of which are involved in and/or controlled by computing devices performing various processes. The number of potential components that may be used in an autonomous vehicle and that satisfy the requirements of the various processes performed by the vehicle and/or its systems may be quite large. For instance, there may be several different computing devices capable of performing a set of required calculations, several different sensors capable of detecting objects in an environment, etc. Each such component may have its own reliability characteristics (e.g., failure rate) and performance attributes (e.g., processor speed, bandwidth, memory capacity, etc.). In order to ensure that an autonomous vehicle can safely travel in an environment, the performance and reliability of each component, system, and subsystem must be considered, in addition to their combined performance and reliability. Determining the components to configure on each system and subsystem configured in an autonomous vehicle may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
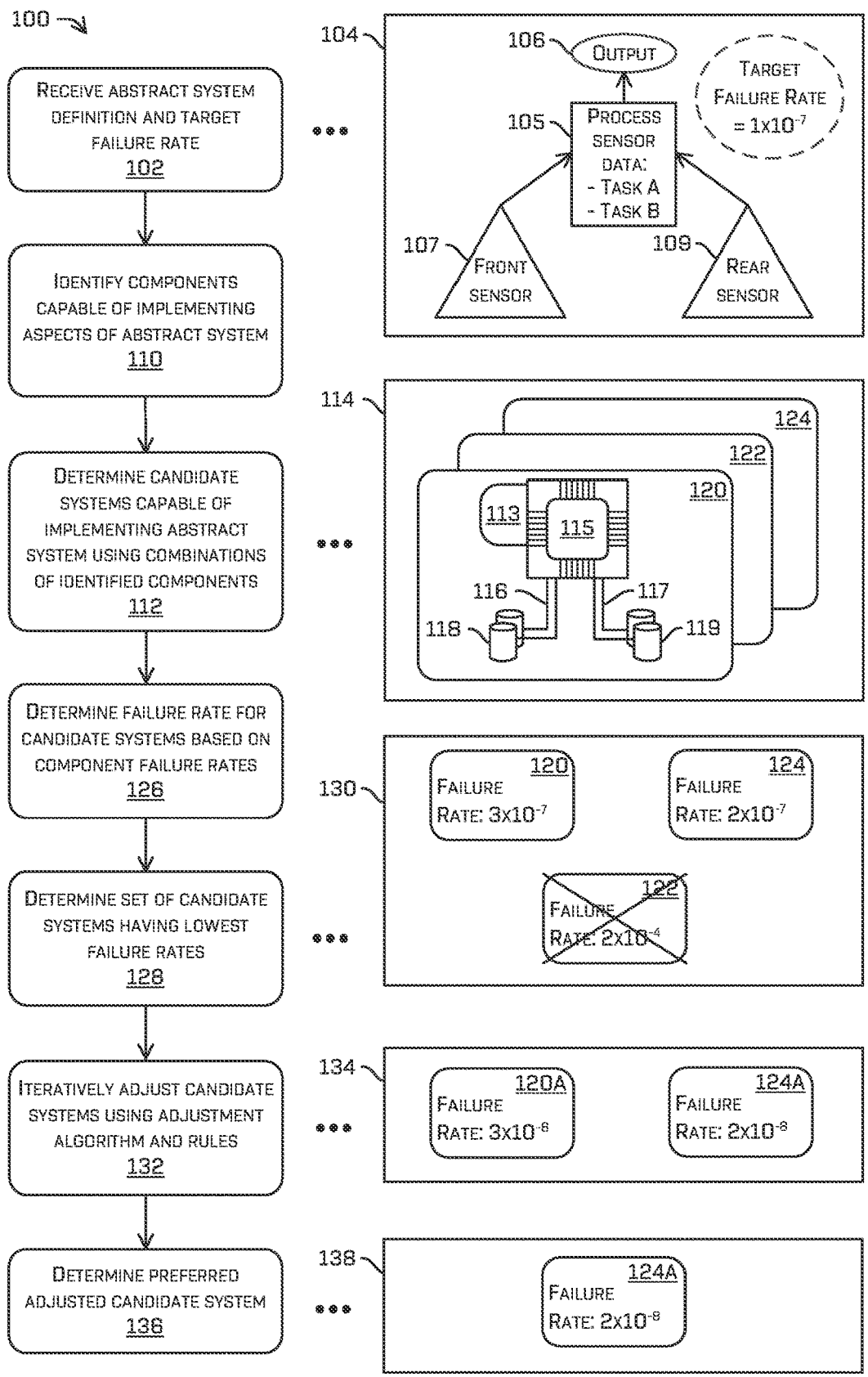
FIG. 1 a pictorial flow diagram of an example process for automatically designing high assurance systems, in accordance with examples of the disclosure.

Techniques for determining suitable physical and/or software components to implement a system as defined by an abstract system definition are discussed herein. In examples, a high assurance design system may receive an abstract system definition that defines various aspects of a system or process to be implemented using physical and/or software components in an implemented (e.g., operational) system, such as an autonomous vehicle. The aspects defined by the abstract system definition may include one or more data inputs, data outputs, data processes (e.g., including one or more tasks to be performed as part of the process and/or that may use the defined data inputs to generate the defined data outputs), other systems with which the system or process represented by the abstract system definition will interact, fitness criteria, and/or any other aspects that may be associated with a system or process represented by an abstract system definition. Fitness criteria defined in the abstract system definition may include one or more performance criteria (e.g., minimum performance requirements), reliability criteria (e.g., maximum tolerable failure rate, component lifetimes, etc.), cost criteria (e.g., component cost, labor cost, total cost, etc.), complexity criteria, fault tolerance criteria (e.g., maximum number of tolerable concurrent failures, etc.), any combination of these, and/or any criteria based on any combination of one of more of such criteria (e.g., a fitness value determined using one or more fitness parameters). For example, the fitness criteria defined in an abstract system definition may include a reliability criterion and a performance criterion. The high assurance design system may analyze the abstract system definition to determine component requirements represented by the definition (e.g., the tasks to be performed as part of one or more processes defined in the abstract system definition) and identify components capable of satisfying those requirements in a database of available components (e.g., physical components and/or software components that may be available for configuration in an autonomous vehicle). The component database may include reliability, performance, interconnectivity, and/or other parameters for the components represented in the database.

Using the components determined to be capable of performing the defined aspects of the system or process represented by the abstract system definition, the high assurance design system may determine one or more initial candidate systems. Based on the parameters (e.g., fitness parameters) associated with the individual components of the determined initial candidate systems, the high assurance design system may determine one or more fitness values for the determined initial candidate systems. The high assurance design system may then analyze one or more of these initial candidate systems (e.g., a subset of the initial candidate systems having higher or more preferred fitness values) to determine one or more adjustments that may be made to the initial candidate systems to improve the fitness values of those systems. These adjustments may include the use of one or more additional components represented in the candidate component database. For example, the high assurance design system may employ an evolutionary, or genetic, algorithm to iteratively adjust the initial candidate systems to generate a set of subsequent candidate systems. The high assurance design system may alternatively or in addition use a set of rules associated with an expert system to determine the various adjustments that it may make to the initial candidate systems.

The high assurance design system may then analyze one or more of these subsequent candidate systems (e.g., a subset of the subsequent candidate systems having higher or more preferred fitness values) to determine one or more additional adjustments that may be made to the subsequent candidate systems to improve the fitness values of those systems. Here again, these adjustments may include the use of one or more additional components represented in the component database. These further adjustments may also employ an evolutionary, or genetic, algorithm and/or a set of rules associated with an expert system. The high assurance design system may iteratively repeat this process, analyzing adjusted sets of candidate systems to determine subsequent sets of candidate systems, until one or more of the determined candidate systems meets or exceeds the fitness parameters provided in the abstract system definition. Should there be multiple candidate systems that meet or exceed the fitness parameters provided in the abstract system definition, the high assurance design system may determine one or more systems from that set of candidate systems based on any of a variety of criteria. Alternatively, the high assurance design system may implement, or provide for implementation (e.g., by displaying to a user on a display within a graphical user interface), a system definition of the multiple candidate systems that meet or exceed the fitness parameters provided in the abstract system definition.

Figure 4:
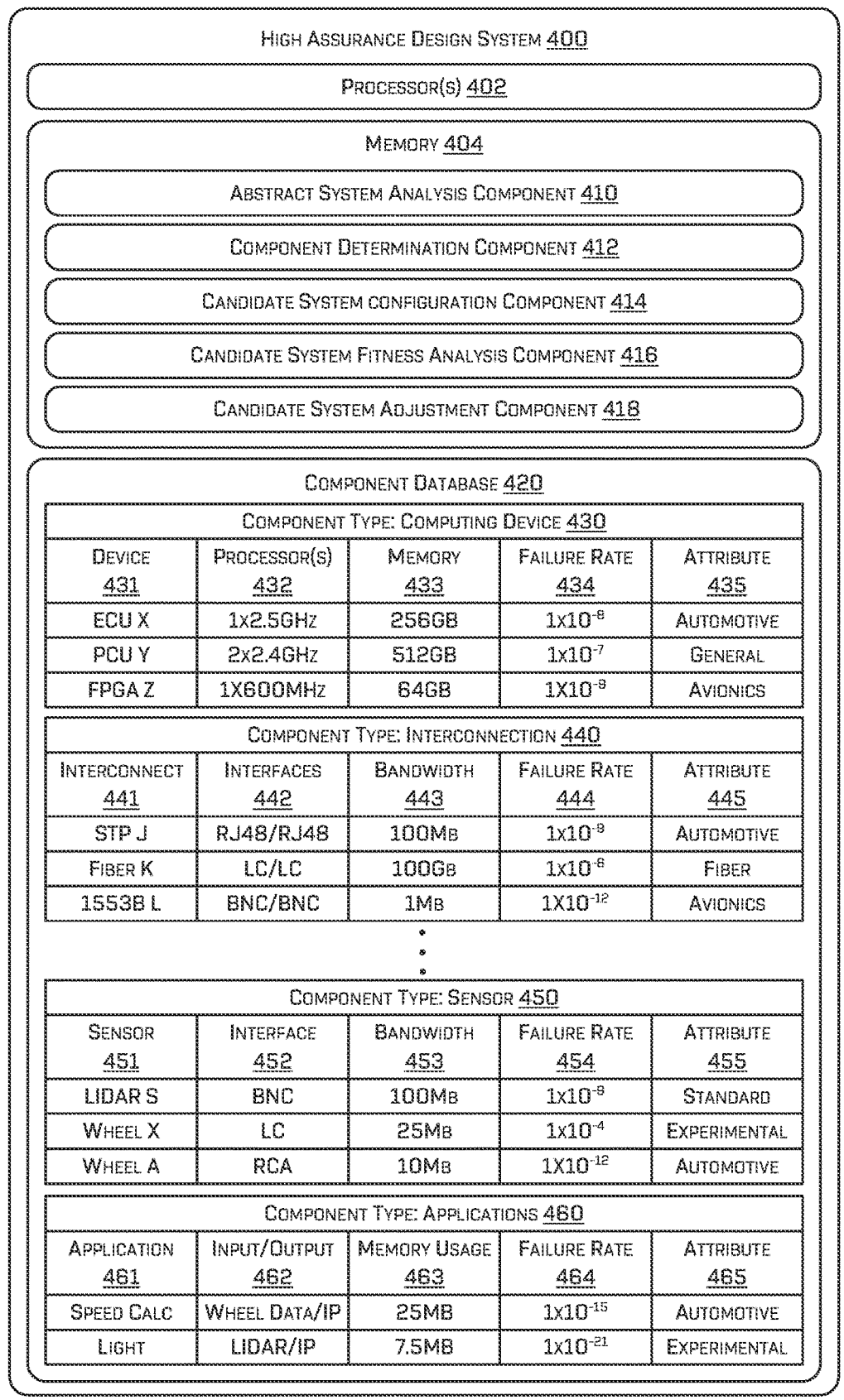
FIG. 4 depicts a block diagram of an example system for implementing the techniques described herein.
Figure 5:
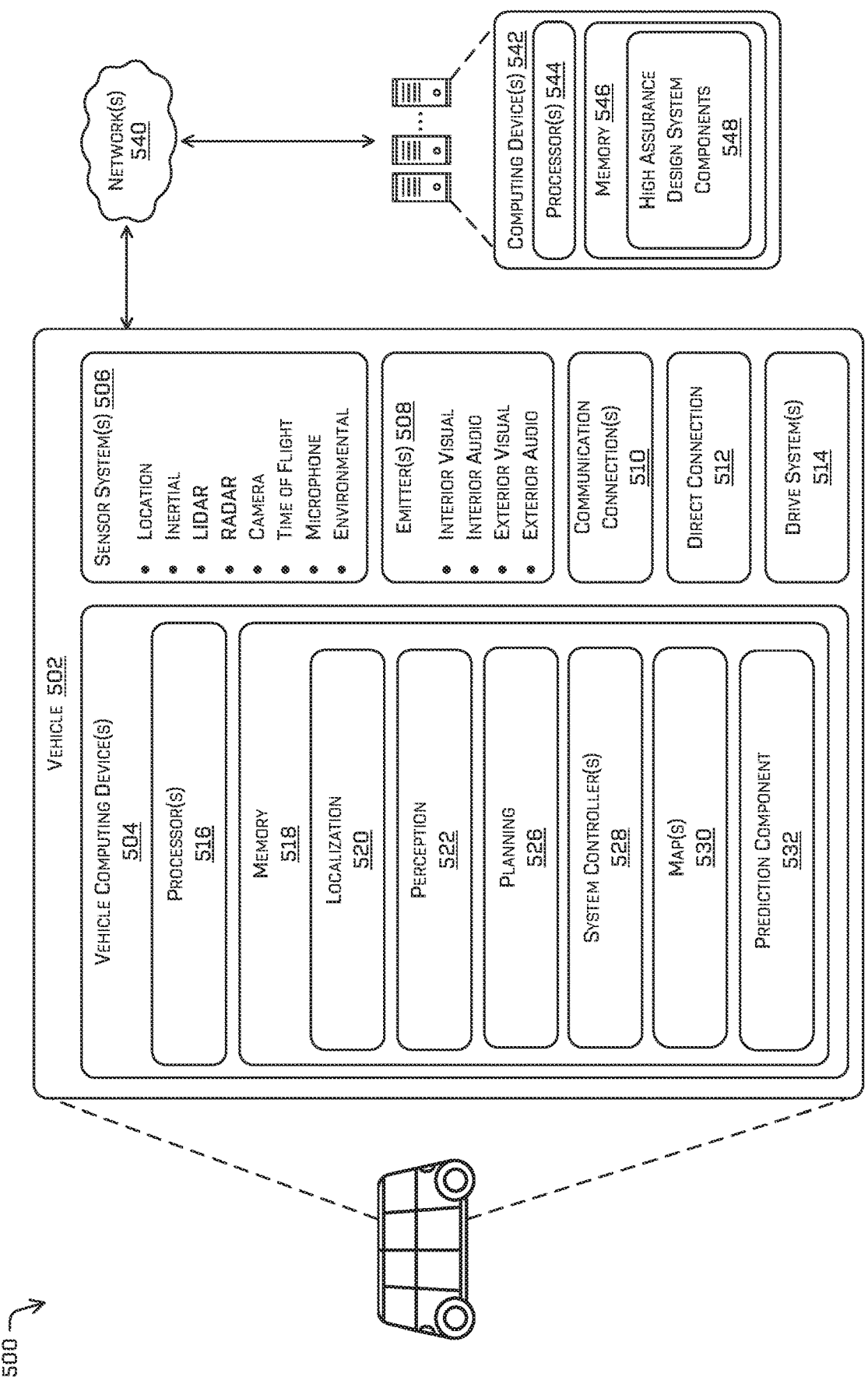
FIG. 5 depicts a block diagram of an example vehicle, components, and systems that may be configured using a high assurance design system, in accordance with examples of the disclosure.

FIG. 1 is a pictorial flow diagram of an example process 100 for automatically designing a high assurance system. In examples, one or more operations of the process 100 may be implemented by a computing system and may use one or more components, such as the one or more of the components and systems illustrated in FIGS. 4 and 5 and described below. For example, the process 100 may be implemented by one or more components and systems that can include processor(s) 402 and/or a memory 404 illustrated in FIG. 4 and/or processor(s) 544 and/or a memory 546 processor(s) illustrated in FIG. 5. One or more of the operations of the process 100 may also be implemented using one or more autonomous vehicle components, such as by using one or more of the components and systems illustrated in FIG. 5 and described below. For example, the operations of the process 100 may use one or more components and systems that can include processor(s) 516, memory 518, and/or sensor systems 506 illustrated in FIG. 5. However, the process 100 is not limited to being performed by and/or using such components and systems, and the components and systems of FIGS. 4 and 5 are not limited to performing the process 100.

At operation 102, a high assurance design system may receive an abstract system definition. The abstract system definition may include data defining one or more aspects of a system or process to be implemented using components in an operational, real-world system, such as an autonomous vehicle. These aspects may include data inputs, data outputs, data processes associated with the data inputs and/or data outputs, task to be performed as part of the data processes, other operational and/or abstract systems with which abstract system will interact, and/or any other aspects that may be associated with the abstract system. The abstract system definition may also include, or may be accompanied by, fitness criteria for the abstract system, such as a target failure rate (e.g., maximum acceptable failure rate). Alternatively, or in addition, fitness criteria may include one or more performance criteria and/or one or more other reliability criteria.

The abstract system definition may include data defining constraints and/or preferences for various aspects of the abstract system. For example, the abstract system definition may include data indicating that defined tasks should or should not be performed by a particular type of component. In another example, the abstract system definition may include data indicating that if a particular type of component is used, one or more other types of components may or may not be used in the same candidate system. In another example, the abstract system definition may include data indicating components of a particular type are preferred even if such component has a higher cost. An abstract system definition may include any other constraints and/or preferences.

In examples, an abstract system definition may be generated and/or stored in any suitable format, such as, but not limited to, JavaScript Object Notation (JSON), extensible markup language (XML), a computer-aided design (CAD) format, an electronic design automation (EDA) format, and/or any other suitable format.

An example 104 represents an abstract system definition that includes a process, inputs, output, and fitness criteria. The abstract system of the example 104 includes two sensors, a front sensor 107 and a rear sensor 109, that provide input to a process 105. The process 105 may be one or more processes and may include one or more tasks per process. For example, a task of the process 105 may be receiving and formatting sensor data from sensors 107 and 109. Another task may be using the sensor data (e.g., as formatted by another task) received from sensors 107 and 109 to generate output 106 that may, for example, be provided to another system. In examples, the process 105 may include any one or more processes and associated tasks associated with operating an autonomous vehicle. For example, the process 105 may use input that includes environmental data to perform processing that generates output that includes a torque to be applied to a wheel.

The process 105 may be a component of the abstract system of example 104 that may be implemented using one or more software components, one or more physical components, and/or any combination thereof. The abstract system of the example 104 includes the fitness criterion of a target failure rate of $1\times10^{-7}$, indicating a maximum tolerable failure rate for the abstract system of the example 104 (e.g., the candidate system that ultimately used to implement the abstract system of the example 104 must have a failure rate less than or equal to $1\times10^{-7}$). As will be appreciated, the abstract system is simplified for ease of illustration, but in real-world examples, the abstract system may include dozens or even hundreds of components, processes, connections, or the like.

At an operation 110, the high assurance design system may identify components that are capable of implementing the various aspects of the system represented by the abstract system definition received at the operation 102. The high assurance system may take into account the constraints and/or preferences that have been included in the abstract system definition in performing this identification of components. For example, the high assurance system may eliminate combinations of components that are not compatible or are not capable of performing the functions of the abstract system when configured together, even if such components may individually be capable of performing individual aspects (e.g., tasks) of the abstract system. Additionally, or instead, the abstract system may include a constraint that a particular type of component (e.g., a particular sensor) must be used. In response, the high assurance design system may identify only those components that are capable of interoperating with that particular type of component as eligible for use in candidate systems.

In examples, the high assurance design system may include, or have access to, a component database that defines the various characteristics of components available for configuration in an autonomous vehicle, such as capabilities, performance, connectivity capabilities, power requirements, physical characteristics (e.g., dimensions, operating temperature ranges, etc.), reliability, etc. The high assurance design system may analyze the abstract system definition received at the operation 102 to determine the component requirements represented by the definition. The high assurance design system may then identify, in the component database, the one or more components capable of satisfying those requirements. For example, the high assurance design system may analyze the tasks to be performed as part of the process 105 and then determine the components (software and/or hardware components) capable of performing the individual tasks.

At an operation 112, the high assurance design system may determine an initial set of one or more candidate systems that are capable of implementing the abstract system represented by the definition received at the operation 102. The high assurance design system assembles the initial candidate systems using the components identified at the operation 110 as capable of performing the various aspects of the abstract system. In examples, the high assurance design system randomly assembles various subsets of the components identified at the operation 110 into systems that are capable of implementing the abstract system defined at the operation 102. For example, the high assurance design system may use a Monte Carlo style randomization of the components to assemble the initial set of candidate systems. In at least some examples, such randomized initialization may be subject to any constraints defined in the abstract system definition (e.g., that a first component receives signals from a second component).

In examples, at the operation 112, the high assurance design system may determine a simple candidate system, such as a single component candidate system, as an initial candidate system. For example, the high assurance design system may determine a customized computing device with integrated sensors and interconnections configured on a single board (e.g., a printed circuit board (PCB)) as an initial candidate system. The high assurance design system may then begin the iterative process of generating subsequent candidate systems using this single component candidate system as initial input to the process. As such a single component candidate system may have low reliability (e.g., being a single point of failure) and high cost (e.g., as a custom-built component), this system is unlikely to meet the fitness criteria of the abstract system definition while the subsequently generated candidate systems will be increasing more likely to meet such fitness criteria.

In examples, at the operation 112, the high assurance design system may determine a complex candidate system, such as a candidate system using a separate components for tasks in the defined processes, as an initial candidate system. For example, the high assurance design system may determine an initial candidate system by generating a graph based on the tasks associated with the process 105 of the abstract system and using a dedicated component for each task in the process. The graph may include input and output associated with each task, calculation and/or other functions performed by each task, etc. The high assurance design system may then use these features of the graph to map components capable of performing the functions to the graph to generate an initial candidate system.

For instance, the high assurance design system may configure a dedicated computing device for individual calculation tasks in the abstract system processes, a dedicated sensor for individual detection tasks in the abstract system definition, dedicated interconnections for individual communications tasks in the abstract system definition, etc. The high assurance design system may then begin the iterative process of generating subsequent candidate systems using this complex candidate system as initial input to the process. As such a complex candidate system may have low reliability (e.g., having many points of failure) and high cost (e.g., using many components), this system is unlikely to meet the fitness criteria of the abstract system definition while the subsequently generated candidate systems will be increasing more likely to meet such fitness criteria.

An example 114 illustrates representations of various initial candidate systems 120, 122, and 124 assembled at the operation 112 using components. In the example 114, the candidate system 120 is composed of a computing device 115, and sensors 118 and 119. The interconnection 116 connects the sensor 118 to the computing device 115 and the interconnection 117 connects the sensor 119 to the computing device 115. In examples, the high assurance design system may have determined that there were several applications, computing devices, and combinations of computing devices and applications capable of performing the processes defined in the abstract system definition and capable of connecting to the types of components that can provide the input for, and receive the output from, the processes defined in the abstract system definition. The high assurance design system may have then determined (e.g., randomly) the application 113 capable of performing the tasks of the process 105 and the computing device 115 capable of executing the application 113 for the initial candidate system 120. The high assurance design system may have then determined (e.g., randomly) the sensors 118 and 119 from a set of one or more sensors determined to be capable of providing the input data required by the processes defined in the abstract system definition and of communicating with the computing device 115. The high assurance design system may have then determined (e.g., randomly) the interconnections 116 and 117 from a set of one or more interconnections determined to be capable of physically connecting to the sensors 118 and 119 to the computing device 115.

The example initial candidate systems 122 and 124 represent alternative candidate systems composed of components identified at the operation 110. These systems may use some, all, or none of the same components as the initial candidate system 120. In examples, the initial candidate systems vary from one another in at least one aspect, for example, by using one or more different components, a different number of components, and/or different configurations of components.

At an operation 126, the high assurance design system may determine one or more failure rates for the initial candidate systems determined at operation 112. For example, the high assurance design system may determine the failure rate for each initial system based on the failure rates of the individual components of such systems (e.g., as defined in the component database). In examples, the high assurance design system may determine these failure rates as described in more detail herein.

At an operation 128, the high assurance design system may determine a subset of the initial candidate systems based on the one or more failure rates. For example, the high assurance design system may determine a subset of the initial candidate systems having a failure rate below a particular threshold, a percentage of the initial systems having the lowest failure rates (e.g., the quartile of systems having the lowest failure rates), a particular number of initial systems having the lowest failure rates (e.g., the ten systems with the lowest failure rates), or the like.

An example 130 illustrates representations of the initial systems 120, 122, and 124 of the example 114 and their respective failure rates. As shown in this example, the initial system 122 has been excluded based on its failure rate, while the initial systems 120 and 124 have been determined to meet the criteria for the set of initial candidate systems. For example, the initial systems 120 and 124 may have failure rates within the lowest 25% of failure rates of the set of initial systems, while the initial system 122 has a failure rate greater than any of the failure rates in the lowest 25% of failure rates of the set of initial systems.

At an operation 132, the high assurance design system may adjust one or more aspects of the initial candidate systems to generate subsequent candidate systems. For example, the high assurance design system may modify the design of the initial candidate systems by adding and/or removing one or more of the components in the systems. Alternatively, or in addition, the high assurance design system may modify the configuration (e.g., arrangement, connectivity, etc.) of one or more of the components in the systems. The high assurance design system may determine component and configuration adjustments using an evolutionary, or genetic, algorithm as described in more detail herein. In examples, the high assurance design system may be configured as an expert system and may use a set of rules to determine the particular component and/or configuration adjustments to apply to the candidate systems. In further examples, the high assurance design system may be configured to determine component(s) and/or configuration adjustments utilizing machine learning techniques, such as using a machine-learned model configured to identify potential system adjustments and determine adjustments for a particular candidate system.

As described in more detail herein, the high assurance design system may perform the operation 132 iteratively, repeatedly adjusting the candidate systems until some criteria is met. For example, the high assurance design system may adjust systems until one or more fitness criteria, such as a maximum failure rate, is met. Alternatively, or in addition, the high assurance design system may adjust systems until there is only a predetermined number of non-duplicate adjusted candidate systems remaining. For example, the high assurance design system may adjust systems to decrease the failure rates of such systems until there are only a particular number (e.g., five, ten, etc.) of distinct candidate systems remaining.

In examples, with each iteration, the high assurance system may determine that the candidate systems are valid systems by ensuring that they remain capable of implementing the abstract system as defined. The high assurance system may eliminate any candidate system (e.g., from the iterative adjustment process) that is incapable of implementing the functions of the abstract system (e.g., is an invalid candidate system).

An example 134 illustrates representations of adjusted candidate systems 120A and 124A, representing initial systems 120 and 124 of the example 130 as adjusted at the operation 132. For example, the high assurance design system may have adjusted the initial system 120 by adding redundant sensors to the initial system 120 to generate the adjusted system 120A. For another example, the high assurance design system may have adjusted the initial system 124 by adding a redundant connection between a sensor and a computing device in the initial system 124 to generate the adjusted system 124A. The representations of adjusted candidate systems 120A and 124A also indicate their respective failure rates. As shown in this example, the failure rates of the adjusted candidate systems 120A and 124A are less than the target failure rate provided with the abstract system definition of the example 104. The meeting of this particular fitness criteria (the target failure rate) may have triggered the high assurance design system to cease iteratively adjusting the systems at the operation 132.

At operation 136, the high assurance design system implementing the process 100 may determine a preferred adjusted candidate system from the candidate systems resulting from the operation 132, for example, for use in an autonomous vehicle or for presentation to a user. For example, the high assurance design system may determine one or more adjusted candidate systems based on one or more criteria (e.g., cost, complexity, etc.). Alternatively, or in addition, the high assurance design system may provide all of the candidate systems resulting from the operation 132. The one or more determined adjusted candidate systems may be defined, represented, and/or stored in any suitable format, such as, but not limited to, JavaScript Object Notation (JSON), extensible markup language (XML), a computer-aided design (CAD) format, an electronic design automation (EDA) format, and/or any other suitable format.

In the example 138, the high assurance design system may have determined that candidate system 124A best meets the fitness criteria (e.g., based on the candidate system 124A's failure rate) specified by the abstract system definition of the example 104.

The systems and techniques described herein may be directed to automatically designing one or more systems to be implemented and put into operational use that meet the safety and reliability requirements of such systems. For example, the systems and techniques described herein may be directed to automatically designing one or more systems for an autonomous vehicle that meet the safety and reliability requirements of the vehicle, thereby enabling safe navigate of such a vehicle through an environment. The systems and techniques described herein can utilize the various algorithmic, expert system, and machine-learned processes described herein in combination with component information and abstract system definitions to more accurately and efficiently determine the best combination of components to implement an abstract process executed by a system. For example, techniques described herein may be faster and/or more robust than conventional techniques, as they may increase the reliability of the operational systems (e.g., implemented in an autonomous vehicle) and reduce the time and cost associated with designing such systems. That is, techniques described herein provide a technological improvement over existing system design processes and the systems resulting from conventional design processes. In addition to improving the efficiency of system design and component determination, the systems and techniques described herein can provide more robust systems by, for example, evaluating large numbers of system designs for various criteria to determine the most reliable and least error-prone systems for implementation.

The systems and techniques described herein can be implemented in a number of ways. Example implementations are provided below with reference to the following figures. Although discussed in the context of designing systems for an autonomous vehicle, the techniques described herein can be applied to a variety of systems (e.g., a sensor system or a robotic platform), and are not limited to autonomous vehicles. For example, the techniques described herein can be applied to semi-autonomous and/or manually operated vehicle. In another example, the techniques can be utilized in an aviation or nautical context, or in any system involving components that may be configured into systems. Further, although discussed in the context of autonomous vehicle data and components implementing abstract systems related to autonomous vehicle processes, the data and components described herein can be any type of data and any type of components that may be used to implement any type of abstract system. Additionally, the techniques and systems described herein can be used with real data (e.g., captured using sensor(s)), simulated data (e.g., generated by a simulator), or any combination of the two.

Figure 2:
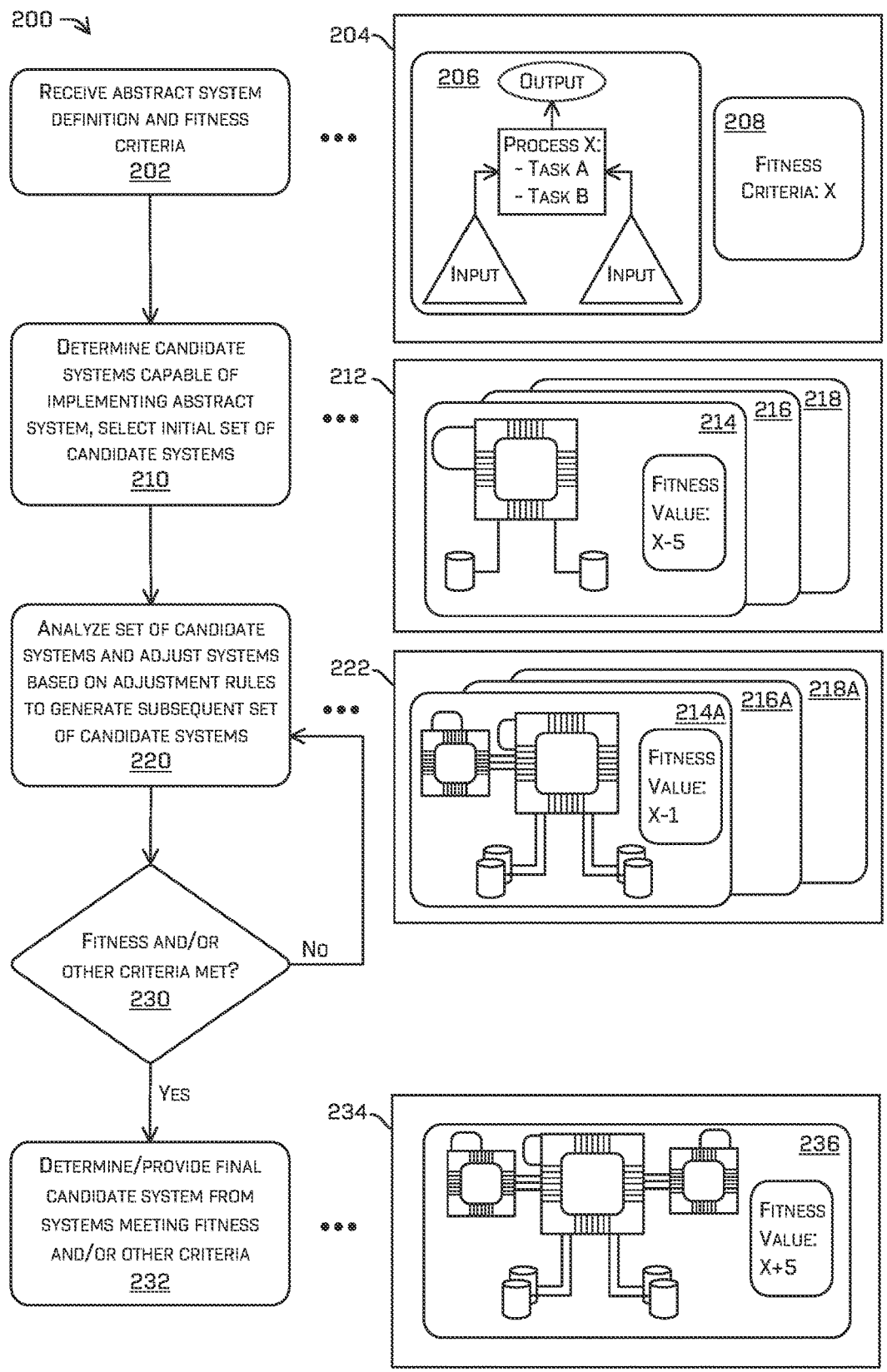
FIG. 2 a pictorial flow diagram of another example process for automatically designing high assurance systems, in accordance with examples of the disclosure.

FIG. 2 is a pictorial flow diagram of another example process 200 for automatically designing a high assurance system. In examples, one or more operations of the process 200 may be implemented by a computing system and may use one or more components, such as the one or more of the components and systems illustrated in FIGS. 4 and 5 and described below. For example, the process 200 may be implemented by one or more components and systems that can include processor(s) 402 and/or a memory 404 illustrated in FIG. 4 and/or processor(s) 544 and/or a memory 546 processor(s) illustrated in FIG. 5. One or more of the operations of the process 200 may also be implemented using one or more autonomous vehicle components, such as by using one or more of the components and systems illustrated in FIG. 5 and described below. For example, the operations of the process 200 may use one or more components and systems that can include processor(s) 516, memory 518, and/or sensor systems 506 illustrated in FIG. 5. However, the process 200 is not limited to being performed by and/or using such components and systems, and the components and systems of FIGS. 4 and 5 are not limited to performing the process 200.

In more detail, a high assurance design system, at an operation 202, receives an abstract system definition that may include, or be accompanied by, one or more fitness criteria. As described herein, the abstract system definition may define aspects of a system or process (e.g., inputs, outputs, processes, tasks, connected systems, etc.) to be implemented using components in an operational system, such as an autonomous vehicle. The fitness criteria may include one or more performance and/or reliability parameters (e.g., maximum tolerable failure rate, minimum data throughput, minimum processing speed, maximum operating temperature, etc.). Fitness criteria defined in the abstract system definition may include one or more performance criteria parameters (e.g., minimum performance requirements), and/or reliability criteria parameters (e.g., maximum tolerable failure rate, component lifetimes, etc.), cost criteria (e.g., component cost, labor cost, total cost, etc.), complexity criteria, fault tolerance criteria (e.g., maximum number of tolerable concurrent failures, etc.), any combination of these, and/or any criteria based on any combination of one of more of such criteria (e.g., a fitness value determined using one or more fitness parameters).

An example 204 represents an abstract system definition that includes a representation of the abstract system 206 and the fitness criteria 208. The abstract system may include a process, inputs, and an output. The fitness criteria may include any of the various fitness criteria described herein, such as failure rate and performance. As will be appreciated, the abstract system is simplified for ease of illustration, but in real-world examples, the abstract system may include dozens or even hundreds of components, processes, connections, or the like. The fitness criteria are similarly simplified for ease of illustration, but in real-world examples, the fitness criteria may include many different values for many different types of fitness criteria and/or any combination thereof.

At an operation 210, the high assurance design system implementing the process 200 may generate an initial set of candidate systems by determining components (e.g., from a component database) capable of performing the various aspects represented by the abstract system definition and configuring such components into initial candidate systems.

The high assurance system may take into account the constraints and/or preferences that have been included in the abstract system definition received at operation 202 in performing this determination of components. For example, the operation 210 may include implementing a Monte Carlo style randomization algorithm to randomly assemble various subsets of the components identified as capable of implementing the abstract system received at the operation 202. In examples, the high assurance design system may be configured to ensure that the generated initial candidate systems are non-duplicative.

Further at the operation 210, the high assurance design system may determine one or more fitness values for the initial candidate systems. As described in more detail herein, the high assurance design system may use the fitness values for individual components in the initial candidate systems to determine one or more system fitness values for such systems. The fitness values for individual components may include one or more performance and/or reliability parameters (e.g., maximum tolerable failure rate, minimum data throughput, minimum processing speed, maximum operating temperature, etc.) that may be included in the data associated with the individual components in a component database.

Further at the operation 210, the high assurance design system may determine a set of candidate systems from the initially determined set of candidate systems for further processing in the process 200. For example, the high assurance design system may determine a subset of the initial candidate systems based on one or more fitness criteria as described herein (e.g., systems having fitness values within a specific range of fitness values, systems having fitness values above or below a fitness value threshold, systems within fitness values and/or other characteristics associated with one or more criteria, etc.).

An example 212 illustrates representations of initial candidate systems 214, 216, and 218 generated by the high assurance design system based on the abstract system definition received at the operation 202. The example 212 further includes a fitness value determined for each of the initial systems as described herein. The initial systems 214, 216, and 218 may have been determined based on a set of initial candidate systems based on one or more criteria, such as being within a group of systems having fitness values within a specific range of fitness values and/or above or below a fitness value threshold.

At an operation 220, the high assurance design system analyzes each of the initial candidate systems to determine whether and how to adjust one or more aspects of the initial candidate systems. In examples, the high assurance design system may use a genetic algorithm to evaluate the fitness of each candidate system to determine whether to adjust the candidate systems. If the high assurance design system determines to adjust the candidate systems, the high assurance design system may use a set of rules (e.g., a set of expert system rules) to determine potential adjustments to each system. The high assurance design system may then adjust the initial candidate systems at the operation 220 based on the adjustments determined using the set of rules. In further examples, the high assurance design system may be configured to determine component and/or configuration adjustments utilizing machine learning techniques, such as using a machine-learned model configured to identify potential candidate system adjustments and determine adjustments for a particular candidate system.

In examples, the high assurance design system may modify the design of an initial candidate system by adding and/or removing one or more of the components in the systems. Alternatively, or in addition, the high assurance design system may modify the configuration (e.g., arrangement, connectivity, etc.) of one or more of the components in the systems. For example, the high assurance design system may have determined (e.g., based on expert system rules) that there are several computing devices and combinations of computing devices capable of performing the processes defined in the abstract system definition. The high assurance design system may then determine, for a particular candidate system, a second computing device to perform a portion of the processes (e.g., one or more tasks) defined in the abstract system definition and interconnections to connect the second computing device to the current computing device in the candidate system. The high assurance design system may modify, or adjust, the candidate system to integrate the second computing device and new interconnections into the candidate system.

In examples, the high assurance design system may similarly add, remove, and/or replace other components. The high assurance design system may use the expert system rules to ensure that components are interoperable and that the adjusted systems remain capable of performing the aspects of the abstract system definition.

Further at operation 220, the high assurance design system analyzes the adjusted systems and determines updated fitness values for those systems. As described in more detail herein, the high assurance design system may use the fitness values for the various components of each adjusted system to determine an adjusted system fitness value.

An example 222 illustrates representations of adjusted candidate systems 214A, 216A, and 218A generated by the high assurance design system based on the initial candidate systems 214, 216, and 218 of example 212. The example 222 further includes an updated fitness value determined for each of the adjusted systems as described herein. For example, the high assurance design system may have adjusted the initial system 214 by adding redundant sensors to the initial system 214 to generate the adjusted system 214A. As shown in this example, the fitness value of candidate system 214A ("X-5") remains below the fitness criteria ("X") included with the abstract system definition in the example 204.

At an operation 230, the high assurance design system may determine whether to adjust, or adjust again, each of the systems currently being processed by the process 200. For example, the high assurance design system may iteratively adjust the candidate systems until one or more fitness criteria is met. The high assurance design system may determine whether that fitness criteria has been met at the operation 230. If the fitness criteria have not been met, the high assurance design system may again perform the operation 220 to adjust the systems based on the expert system rules. The high assurance design system may again determine updated fitness values for the adjusted systems and return to the operation 230 to evaluate the updated fitness values for the adjusted systems against the fitness criteria. In examples, the high assurance design system may determine that the fitness criteria have been met when a single adjusted system has a fitness value meeting the criteria. Alternatively, the high assurance design system may determine that the fitness criteria have been met when a predetermined number of the adjusted systems have fitness values meeting the criteria. Alternatively, or in addition, the system may determine that the fitness criteria have been met when a percentage and/or threshold number of the adjusted systems have fitness values meeting the criteria. Other determinations may also, or instead, be used to determine when fitness criteria have been met.

In various examples, the high assurance design system may use one or more other types of stopping criteria in determining whether the continue performing the iterative candidate system adjustment process. In examples, stopping criteria may be defined in and/or determined based on an abstract system definition, while in other examples, the high assurance design system may obtain and/or determine stopping criteria using other techniques. In examples, the high assurance design system may determine whether to adjust, or adjust again, each of the systems currently being processed by the process 200 based on a number of iterations of candidate system adjustments performed (e.g., stop the iterative adjustment process once a threshold number of iterations has been reached). In additional examples, the high assurance design system may determine a rate of improvement of the fitness parameter of the candidate systems and determine whether to adjust, or adjust again, each of the systems currently being processed by the process 200 based on the rate of fitness parameter improvement (e.g., stop the iterative adjustment process once the rate of fitness parameter improvement flattens out or otherwise fails to meet a minimum improvement rate).

Referring to the example 222, the fitness value of candidate system 214A is "X-1" and thus is below the fitness criteria "X" included with the abstract system definition in the example 204. Therefore, if the high assurance design system determines that the remaining adjusted candidate systems also have fitness values lower than the fitness criteria, at the operation 230 the high assurance design system may determine to further adjust the systems.

If the high assurance design system determines that the fitness criteria have been met, the high assurance design system may determine and/or provide the final one or more adjusted candidate systems at an operation 232. If there are multiple adjusted candidate systems meeting the fitness criteria, the high assurance design system may use one or more additional criteria to determine one or more of the multiple adjusted candidate systems at operation 232.

An example 234 illustrates a representation of a final adjusted candidate system 236 and its associated fitness value. As shown in this example, the fitness criteria of the system 236 ("X+5") exceeds the fitness criteria ("X") included with the abstract system definition in the example 204. The meeting of the fitness criteria by the system 236 may have triggered the high assurance design system to determine to cease iteratively adjusting the systems at the operation 230. For example, the high assurance design system may have added redundant connections between the sensors and a computing device of an initial system and a second computing device communicatively connected to the original computing device of the initial system to generate the final adjusted candidate system 236.

Figure 3:
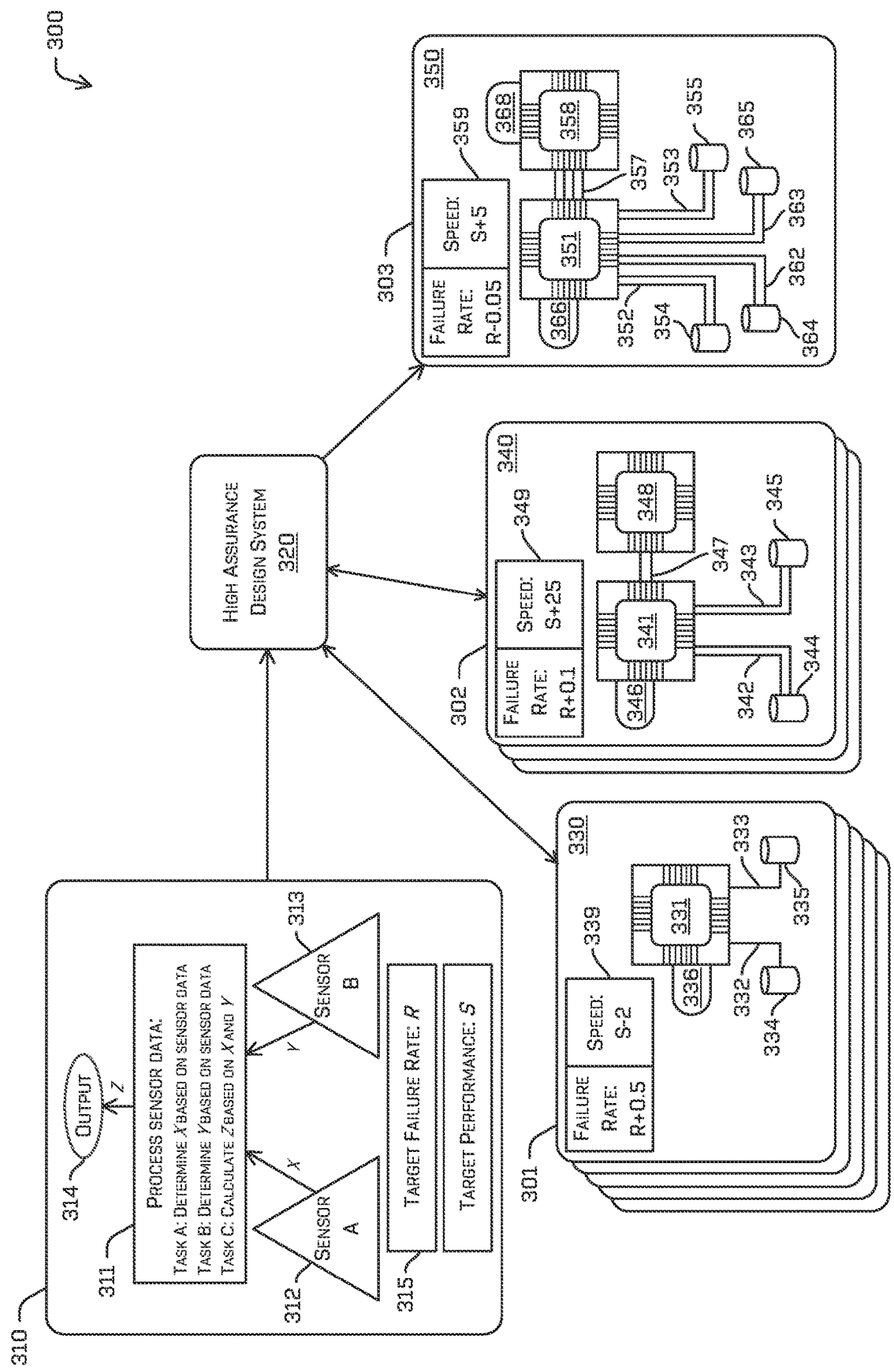
FIG. 3 is a diagrammatic representation of a high assurance design system and data processed by such a system, in accordance with examples of the disclosure.

FIG. 3 depicts a block diagram 300 of example systems that may be used and/or generated by the techniques described herein. An example abstract system definition 310 is provided to a high assurance design system 320. The abstract system definition 310 may include the aspects of a process 311 that processes sensor data (input X and Y) received from sensors 312 and 313 to generate output 314 (output Z). For example, the process 311 may include the tasks of determining X based on sensor data, determining Y based on sensor data, and calculating Z based on X and Y. The abstract system definition 310 may also include, or be associated with, fitness criteria 315 (target failure rate R, target performance S). The abstract system definition 310 may also or instead include constraints and/or preferences as described herein.

The high assurance design system 320 may generate initial candidate systems 301 based on the abstract system definition 310, for example, as described herein. The initial candidate systems 301 may include an initial candidate system 330 that the high assurance design system 320 configured with sensors 334 and 335 connected to computing device 331 by interconnections 332 and 333, respectively. The computing device 331 may be capable of executing an application 336 that the high assurance design system 320 determined is capable of performing one or more tasks of the process 311 of the abstract system definition 310. In examples, the initial candidate system 330 may correspond to and/or include aspects of the systems 120, 122, and/or 124 from FIG. 1 and/or the systems 214, 216, and/or 218 from FIG. 2.

The high assurance design system 320 may determine fitness values for the initial candidate systems 301, for example, based on the fitness values of the individual components in the systems. For example, for the initial candidate system 330, the system may determine a failure rate value and a performance value for the system based on the failure rates and the performance values for the components 331, 332, 333, 334, 335, and 336. Due to the configuration of the components in the system 330, as shown in the figure, the individual components may represent a single point of failure. Therefore, the failure rate of the entire system 330 may be the highest failure rate of any one of the components (R+0.5 as indicated at 339). Similarly, the performance of the system 330 may be dictated by the performance of the slowest single component (S−2 as indicated at 339). As these fitness values do not meet the target fitness values associated with the abstract system definition 310, the high assurance design system 320 may adjust the initial candidate systems 301, for example, as described herein.

In examples, various techniques may be used to determine a system failure rate, performance, and/or any other type of fitness value. For example, the high assurance design system 320 may generate a tree (e.g., fault tree) for the system 330 that includes data (e.g., fitness data) associated with the components 331, 332, 333, 334, 335, and 336. The high assurance design system 320 may then determine one or more fitness values for the system 330 based on the tree. In other examples, the high assurance design system 320 may average component fitness values from all or a subset of the components in a system to determine a system fitness value. The high assurance design system 320 may alternatively or in addition apply weighting factors to one or more fitness values for one or more components in a system to determine a system fitness value.

In examples, the high assurance design system 320 may determine fitness values for components based on data stored in a component database and associated with such components. For example, cost, reliability, performance, and/or any other fitness parameter values may be stored with components in the respective database records. Alternatively or in addition, the high assurance design system 320 may determine fitness values for components by calculating such fitness values based on available data (e.g., from a component database and/or elsewhere). For example, the high assurance design system 320 may determine identifying information for a component (e.g., serial number, model number, etc.) and determine a current cost for the component to determine a cost-related fitness value for the component.

In another example, the high assurance design system 320 may use one or more values associated with a component to calculate an aggregated value to be used as a fitness value for the component. In other examples, the high assurance design system 320 may simulate the operation of one or more components and determine, based on the results of such simulations, one or more fitness values for such components.

In examples, in addition to or instead of using component fitness values to determine a system fitness value, the high assurance design system 320 may simulate the operation of the components in a candidate system as configured in the candidate system and determine, based on the results of such simulations, one or more fitness values for such the candidate system.

The high assurance design system 320 may generate adjusted candidate systems 302 based on the initial candidate systems 301, for example, using a genetic algorithm and/or expert system rules as described herein. The adjusted candidate systems 302 may include an adjusted candidate system 340 representing an adjusted version of the initial candidate system 330. In this example, the high assurance design system 320 configured the adjusted candidate system 340 with sensors 344 and 345 connected to a computing device 341 by interconnections 342 and 343, respectively. The computing device 341 may be capable of executing an application 346 that the high assurance design system 320 determined is capable of performing one or more tasks of the process 311 of the abstract system definition 310. The high assurance design system 320 further configured the adjusted candidate system 340 with a second computing device 348 connected to the computing device 341 with an interconnection 347. As shown in the figure, the interconnections 342, 343, and 347 include two connections per interconnection, thereby increasing the reliability of these components as compared to the initial candidate system 330.

Because of this increased reliability, the failure rate of the entire system 340 is, for example, not based on the highest failure rate of any one of the components. Instead, the failure rate of the system is reduced (R+0.1 as indicated at 349). Furthermore, due to the use of the second computing device 348 (e.g., to offload processing intensive activities specified by the abstract system definition 310), the speed of the system 340 may be increased (S+25 as indicated at 349). However, because both these fitness values do not meet the target fitness values associated with the abstract system definition 310, the high assurance design system 320 may further (e.g., iteratively) adjust the adjusted candidate systems 302, for example, as described herein.

As described above, various techniques may be used to determine a system failure rate, performance, and/or any other type of fitness value for any system described herein. For example, the high assurance design system 320 may generate a tree (e.g., fault tree) for the system 340 that includes data (e.g., fitness data) associated with the components 341, 342, 343, 344, 345, 346, 347, and 348. The high assurance design system 320 may then determine one or more fitness values for the system 340 based on the tree. In other examples, the high assurance design system 320 may average component fitness value from all or a subset of the components in a system to determine a system fitness value. The high assurance design system 320 may alternatively or in addition apply weighting factors to one or more fitness values for one or more components in a system to determine a system fitness value.

The high assurance design system 320 may generate adjusted candidate systems 303 based on the adjusted candidate systems 302, for example, using a genetic algorithm and/or expert system rules as described herein. The adjusted candidate systems 303 may include an adjusted candidate system 350 representing an adjusted version of the adjusted candidate system 340. In this example, the high assurance design system 320 configured the adjusted candidate system 350 with four sensors 354, 355, 364, and 365 connected to a computing device 351 by interconnections 352, 353, 362, and 363, respectively. The high assurance design system 320 further configured the adjusted candidate system 350 with a more redundant interconnection 357 between a second computing device 358 and the computing device 351. The high assurance design system 320 may have determined the tasks of the process 311 may be more efficiently and/or reliably distributed across applications 366 and 368 executing on computing device 351 and 358, respectively. As shown in the figure, the interconnections 352, 353, 362, and 363 include two connections per interconnection and the interconnection 357 includes four connections, thereby increasing the reliability of these components as compared to the adjusted candidate system 340.

Because of this increased reliability, the failure rate of the entire system 350 is even further reduced (R−0.05 as indicated at 359). While the added components may slow the speed of the speed of the system 350 (S+5 as indicated at 359), the trade-off for greater reliability may be desirable (e.g., based on the expert system rules). Since both fitness values of the adjusted candidate system 350 meet or exceed the target fitness values associated with the abstract system definition 310, the high assurance design system 320 may not further (e.g., iteratively) adjust the adjusted candidate systems 303 and may provide these systems and final adjusted candidate systems.

As described herein, various techniques may be used to determine a system failure rate, performance, and/or any other type of fitness value for any system described herein. For example, the high assurance design system 320 may generate a tree (e.g., fault tree) for the system 350 that includes data (e.g., fitness data) associated with the components 351, 352, 353, 345, 355, 357, 358, 362, 363, 365, 366, and 368. The high assurance design system 320 may then determine one or more fitness values for the system 350 based on the tree. In other examples, the high assurance design system 320 may average component fitness value from all or a subset of the components in a system to determine a system fitness value. The high assurance design system 320 may alternatively or in addition apply weighting factors to one or more fitness values for one or more components in a system to determine a system fitness value.

FIG. 4 depicts a block diagram of an example high assurance design system 400 for implementing the techniques described herein. In examples, the high assurance design system 400 includes one or more processors 402 and memory 404 communicatively coupled with the one or more processors 402. In the illustrated example, the memory 404 of the high assurance design system 400 stores an abstract system analysis component 410, a component determination component 412, a candidate system configuration component 414, a candidate system fitness analysis component 416, and a candidate system adjustment component 418. Though depicted in FIG. 4 as residing in the memory 404 for illustrative purposes, it is contemplated that the abstract system analysis component 410, the component determination component 412, the candidate system configuration component 414, the candidate system fitness analysis component 416, and the candidate system adjustment component 418 can additionally, or alternatively, be accessible to the high assurance design system 400 (e.g., stored remotely).

The processor(s) 402 of the high assurance design system 400 can be any suitable processor capable of executing instructions to process data and perform operations as described herein. By way of example and not limitation, the processor(s) 402 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 404 is an example of non-transitory computer-readable media. The memory 404 can store an operating system and one or more software applications, instructions, programs, and/or data to implement the methods described herein and the functions attributed to the various systems. In various implementations, the memory 404 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and components, of which those shown in the accompanying figures are merely examples that are related to the discussion herein.

In examples the high assurance design system 400 includes a component database 420 that stores data associated with one or more components that may be used in candidate systems. For example, the component database 420 may store data associated with components that may be configured in systems implemented in autonomous vehicles. The component database 420 may be communicatively coupled with the one or more processors 402. Though depicted in FIG. 4 as residing in the high assurance design system 400 for illustrative purposes, it is contemplated that the component database 420 can additionally, or alternatively, be accessible to the high assurance design system 400 (e.g., stored remotely).

In examples, the component database 420 may store records for various types of components that may be available for configuration in candidate systems, such as computing device component records 430. The computing device component records 430 may include data indicating various parameters and characteristics associated with one or more computing devices. In examples, the component records in the component database 420 include one or more fitness characteristics of any suitable type for individual components and/or combinations of components represented in the records. Such fitness characteristic may be represented in any suitable format and/or units. For example, a failure rate may be expressed as failures over a period of time (e.g., failures per year, failures per decade, etc., may be expressed as '$\lambda$')). In examples, a fitness characteristic representing component failures may be expressed as mean time between failures (MTBF-predicted elapsed time between inherent failures of the component, may be expressed as "$1/\lambda$").

For example, the computing device component records 430 may include a device identifier 431 (e.g., as shown in the figure, ECU X, PCU Y, FPGA Z) and physical characteristics of a computing device such as processor(s) 432 (e.g., as shown in the figure, one 2.5 GHz processor, two 2.4 GHz processors, one 600 MHz processor) and memory 433 (e.g., as shown in the figure, 256 GB, 512 GB, 64 GB). The computing device component records 430 may alternatively or in addition include one or more fitness characteristics of any suitable type. For example, the computing device component records 430 may include a failure rate 434 (e.g., as shown in the figure, $1 \times 10^{-8}$, $1 \times 10^{-7}$, $1 \times 10^{-9}$ failures per unit of time (e.g., failures per year, failures per decade, etc., may be expressed as '$\lambda$')). In examples, mean time between failures (MTBF-predicted elapsed time between inherent failures of the component, may be expressed as "$1/\lambda$") may be used instead of, or in addition to, failure rate. The computing device component records 430 may alternatively or in addition include any other attributes, parameters, and/or characteristics that may be associated with a computing device, such as hardware characteristics (e.g., connector types, power requirements, operating temperature ranges, shock tolerance, etc.), software characteristics (e.g., supported protocols, supported standards, input data type, output data types, etc.), and descriptive data, such as attribute 435 (e.g., as shown in the figure, "Automotive," "General," "Avionics"). Any of these attributes, parameters, and/or characteristics may be used in determining whether components represented in the computing device component records 430 are capable of implementing tasks or functions defined in an abstract system definition.

The component database 420 may alternatively or in addition include data indicating various parameters and characteristics associated with one or more interconnections that may be used to provide communicative connectivity between components, such as interconnection component records 440. For example, the interconnection component records 440 may include an interconnection identifier 441 (e.g., as shown in the figure, STP J, Fiber K, 1553B L) and physical characteristics of an interconnection, such as physical interfaces 442 (e.g., as shown in the figure, RJ48/RJ48, LC/LC, BNC/BNC) and supported bandwidth 443 (e.g., as shown in the figure, 100 Mb, 100 Gb, 1 Mb). The interconnection component records 440 may alternatively or in addition include fitness characteristics, such as failure rate 444 (e.g., as shown in the figure, $1 \times 10^{-9}$, $1 \times 10^{-8}$, $1 \times 10^{-12}$). The interconnection component records 440 may alternatively or in addition include any other attributes, parameters, and/or characteristics that may be associated with an interconnection, such as other physical characteristics (e.g., maximum length, etc.) and descriptive data, such as attribute 445 (e.g., as shown in the figure, "Automotive," "Fiber," "Avionics"). Any of these attributes, parameters, and/or characteristics may be used in determining whether components represented in the interconnection component records 440 are capable of implementing tasks or functions defined in an abstract system definition.

The component database 420 may alternatively or in addition include data indicating various parameters and characteristics associated with one or more sensors that may be used to detect objects in environments and/or generate sensor data that may, for example, be provided to other components, such as sensor component records 450. For example, the sensor component records 450 may include a sensor identifier 451 (e.g., as shown in the figure, lidar S, wheel X, wheel Y) and characteristics of the sensor, such as physical interfaces 452 (e.g., as shown in the figure, BNC, LC, RCA) and supported bandwidth 453 (e.g., as shown in the figure, 100 Mb, 25 Mb, 10 Mb). The sensor component records 450 may alternatively or in addition include fitness characteristics, such as failure rate 454 (e.g., as shown in the figure, $1 \times 10^{-9}$, $1 \times 10^{-4}$, $1 \times 10^{-12}$). The sensor component records 450 may alternatively or in addition include any other attributes, parameters, and/or characteristics that may be associated with a sensor, such as hardware characteristics (e.g., power requirements, operating temperature ranges, shock tolerance, etc.), software characteristics (e.g., supported protocols, supported standards, resolution, detected spectra, input data types, output data types, etc.), and descriptive data, such as attribute 455 (e.g., as shown in the figure, "Standard," "Experimental," "Automotive"). Any of these attributes, parameters, and/or characteristics may be used in determining whether components represented in the sensor component records 450 are capable of implementing tasks or functions defined in an abstract system definition.

The component database 420 may alternatively or in addition include data indicating various parameters and characteristics associated with one or more software applications (e.g., any type of executable software) that may, for example, be capable of performing one or more functions and/or tasks in an operational system, such as applications component records 460. For example, the applications component records 460 may include an application identifier 461 (e.g., as shown in the figure, "Speed Calc," and "Light") and characteristics of the application, such as input/out 462 (e.g., as shown in the figure, "wheel data/IP" and "lidar/IP"), memory usage 463 (e.g. minimum memory requirements) (e.g., as shown in the figure, 25 MB and 7.5 MB). The applications component records 460 may alternatively or in addition include fitness characteristics, such as failure rate 464 (e.g., as shown in the figure, $1 \times 10^{-15}$ and $1 \times 10^{-21}$). The applications component records 460 may alternatively or in addition include any other attributes, parameters, and/or characteristics that may be associated with an application or other piece of software, such as hardware requirements (e.g., processing power requirements, required disk space, supported hardware, etc.), software characteristics (e.g., supported protocols, supported standards, unput data types, output data types, etc.), and descriptive data, such as attribute 465 (e.g., as shown in the figure, "Automotive" and "Experimental"). Any of these attributes, parameters, and/or characteristics may be used in determining whether components represented in the applications component records 460 are capable of implementing tasks or functions defined in an abstract system definition.

In various examples, other types of components are also, or instead, represented in a component database such as the database 420. Data stored in such a database may be stored in any suitable format and accessible using any suitable means for use with the disclosed examples. Any one or more of the pieces of data associated with a component in a component database such as the database 420 may be used for more than one purpose in the techniques described herein. For example, the processor(s) 432 value may be used as a component attribute when determining components for a candidate system according to the disclosed techniques and also as a fitness value when determining a system fitness value according to the disclosed techniques.

In examples, the abstract system analysis component 410 can include functionality to receive an abstract system definition and fitness criteria for an abstract system and determine the corresponding operational system requirements, for example as described herein. For example, the abstract system analysis component 410 may determine that data from wheel sensors configured on the front and rear of an autonomous vehicle is required to perform one or processes defined by the abstract system definition. The abstract system analysis component 410 may also, or instead, determine a minimum processor performance required to process data received from sensors and to generate output required by one or processes defined by the abstract system definition. The abstract system analysis component 410 may perform any other analysis and/or determinations that may be used to assist in the determination of components capable of performing the various aspects defined in an abstract system definition.

In examples, the component determination component 412 can include functionality to receive component requirements (e.g., from the abstract system analysis component 410) and identify components capable of meeting such component requirements (e.g., in the component database 420). For example, the component determination component 412 may receive data from the abstract system analysis component 410 indicating wheel sensor requirements and may query the component database 420 to identify one or more wheel sensors that meet the wheel sensor requirements. The component determination component 412 may also, or instead, receive data from the abstract system analysis component 410 indicating minimum processor capabilities and may query the component database 420 to identify one or more computing devices having capabilities that meet the minimum processor capabilities. The component determination component 412 may also, or instead, determine one or more components based on the requirements of one or more other components. For example, using the sensors and computing devices determined based on the requirements received from the abstract system analysis component 410, the component determination component 412 may determine one or more interconnections compatible with and/or capable of connecting such sensors and computing devices (e.g., via interaction with the component database 420). The component determination component 412 may perform any other analysis and/or determinations that may be used to determine components capable of performing the various aspects defined in an abstract system definition.

In examples, the candidate system configuration component 414 can include functionality to configure one or more systems using components capable of performing the functions of an abstract system. For example, the candidate system configuration component 414 may receive data indicating particular functionality of an abstract system (e.g., from the abstract system analysis component 410) and data indicating the available components capable of meeting the component requirements of the abstract system (e.g., from the component determination component 412). The candidate system configuration component 414 may use this data to configure one or more candidate systems, for example, as used in the techniques described herein. In examples, the candidate system configuration component 414 may randomly determine components capable of performing the required functions to generate a set of candidate systems for further analysis as described herein. For instance, the candidate system configuration component 414 may use a Monte Carlo style randomization of the components to assemble a set of candidate systems based on the required functionality of the abstract system. For example, the candidate system configuration component 414 may randomly determine one of several capable types of computing devices, two of several capable types of sensors, and two of several capable types of interconnections to assemble a system requiring a computing device and data from two sensors. The candidate system configuration component 414 may then determine a different combination of computing device, sensors, and interconnection to generate a subsequent candidate system. The candidate system configuration component 414 may perform such system generation until all possible combinations have been exhausted, until a particular threshold number of systems has been generated, and/or until one or more other criteria are met.

In examples, the candidate system fitness analysis component 416 can include functionality to assess the fitness of one or more candidate systems configured to perform the functions of an abstract system. For example, the candidate system fitness analysis component 416 may receive data indicating the components and configuration of one or more candidate systems (e.g., from the candidate system configuration component 414) and may determine fitness data for each component of such candidate systems. The candidate system fitness analysis component 416 may determine individual component fitness data from the candidate systems (e.g., as received the candidate system configuration component 414) and/or may use such data to retrieve individual component fitness data (e.g., from the component database 420 based on the data received the candidate system configuration component 414). For example, the candidate system fitness analysis component 416 may determine the fitness data for a computing device, sensors, and interconnections associated with a particular system and calculate one or more system fitness values for the system based on the such fitness data. As described herein, the candidate system fitness analysis component 416 may also use system configuration data in the fitness analysis. For example, the candidate system fitness analysis component 416 may integrate redundancies and/or performance impacts of the particular system configuration into the determination of fitness data for a system. The fitness analysis performed by the candidate system fitness analysis component 416 may include any suitable fitness data, such as reliability data (e.g., failure rate) and performance data (e.g., processor speed, bandwidth, memory, etc.).

In examples, the candidate system adjustment component 418 can include functionality to determine whether the fitness of one or more candidate systems meets one or more criteria and, if not, to initiate one or more adjustments to the candidate systems. For example, the candidate system adjustment component 418 may receive data indicating one or more candidate systems and their associated fitness data (e.g., from the candidate system fitness analysis component 416) and determine whether such fitness data meets one or more fitness criteria associated with an abstract system (e.g., as received from the abstract system analysis component 410). If the candidate system adjustment component 418 determines that the fitness criteria is not (e.g., fully) met, the candidate system adjustment component 418 may generate adjusted systems based on the received candidate systems. For example, the candidate system adjustment component 418 may determine that the fitness data for a computing device, sensors, and interconnections associated with a particular system does not meet the criteria associated with an abstract system that the particular system is intended to implement. The candidate system adjustment component 418 may then add, remove, and/or modify one or more components of the system, for example, using components capable of performing functions of the abstract system as determined by the component determination component 412. Alternatively, or in addition, the candidate system adjustment component 418 may modify the configuration of the system. In examples, the candidate system adjustment component 418 may instruct the candidate system configuration component 414 to perform these functions.

The candidate system adjustment component 418 may provide, directly or indirectly, the adjusted systems to the candidate system fitness analysis component 416 for fitness analysis. Based on the results of this analysis, the candidate system adjustment component 418 may determine whether additional adjustments are warranted (e.g., if the fitness data for the adjusted systems does not meet the criteria associated with the abstract system). The candidate system adjustment component 418 may iteratively perform this process until the abstract system fitness criteria is met and/or until one or more other criteria is met, as described herein.

As described herein, the candidate system adjustment component 418 may use an evolutionary, or genetic, algorithm to adjust the candidate systems and generate adjusted candidate systems. In determining components for candidate systems, either or both of the candidate system adjustment component 418 and the component determination component 412 may use a set of rules associated with an expert system to determine the various adjustments made to candidate systems.

The high assurance design system 400 may be implemented using artificial intelligence (e.g., as an expert system) and/or may include one or more models, algorithms, and/or machine learning algorithms. In some instances, the components in the memory 404 (and the memory 546, discussed below) can be implemented as a neural network, as described in more detail below. Alternatively, or in addition, any type of machine learning (e.g., as described in more detail below) can be used to implement any of the aspects of the high assurance design system 400. For example, the high assurance design system 400 may be implemented as an expert system that uses rules that are iteratively refined using machine learning and one or more feedback mechanisms.

FIG. 5 depicts a block diagram of an example system 500 for implementing the techniques described herein. In at least one example, the system 500 can include a vehicle 502. The vehicle 502 can include various physical and/or software components that may be included in systems generated using the techniques described herein, such as a vehicle computing device 504, one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 526, one or more system controllers 528, one or more maps 530, and a prediction component 532. Though depicted in FIG. 5 as residing in memory 518 for illustrative purposes, it is contemplated that the localization component 520, the perception component 522, the planning component 526, the one or more system controllers 528, the one or more maps 530, and the prediction component 532 can additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 526 can determine a path for the vehicle 502 to follow to traverse through an environment. For example, the planning component 526 can determine various routes and trajectories and various levels of detail. For example, the planning component 526 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 526 can generate an instruction for guiding the autonomous vehicle along at least a portion of the route from the first location to the second location. In at least one example, the planning component 526 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 528, which can be configured to control steering, propulsion, braking, safety, emitters, communication, and other systems of the vehicle 502. These system controller(s) 528 can communicate with and/or control corresponding systems of the drive system(s) 514 and/or other components of the vehicle 502.

The memory 518 can further include one or more maps 530 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 530 can include at least one map (e.g., images and/or a mesh). In some examples, the vehicle 502 can be controlled based at least in part on the maps 530. That is, the maps 530 can be used in connection with the localization component 520, the perception component 522, and/or the planning component 526 to determine a location of the vehicle 502, identify objects in an environment, and/or generate routes and/or trajectories to navigate within an environment.

In some examples, the one or more maps 530 can be stored on a remote computing device(s) (such as the computing device(s) 542) accessible via network(s) 540. In some examples, multiple maps 530 can be stored based on, for example, a characteristic (e.g., type of entity, time of day, day of week, season of the year, etc.). Storing multiple maps 530 can have similar memory requirements but increase the speed at which data in a map can be accessed.

In general, the prediction component 532 can generate predicted trajectories of objects in an environment. For example, the prediction component 532 can generate one or more predicted trajectories for vehicles, pedestrians, animals, and the like within a threshold distance from the vehicle 502. In some instances, the prediction component 532 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 518 (and the memory 546, discussed below) can be implemented as a neural network.

As described herein, an exemplary neural network is an algorithm that passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network Stacked (CNN), Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 506 can include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the LIDAR sensors can include individual LIDAR sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 540, to the one or more computing device(s) at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data to one or more computing device(s) 542 via the network(s) 540. In some examples, the vehicle 502 can send raw sensor data to the computing device(s) 542. In other examples, the vehicle 502 can send processed sensor data and/or representations of sensor data to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can include processor(s) 544 and a memory 546 storing one or more high assurance design system components 548, such as those described herein. In some instances, the high assurance design system components 548 can substantially correspond to the components of the high assurance design system 400 (or otherwise as described herein) and can include functionality to iteratively generate one or more candidate systems and analyze the fitness of such systems.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

EXAMPLE CLAUSES

A: A system comprising: one or more processors; and one or more computer-readable media storing instructions executable by the one or more processors, wherein the instructions, when executed, cause the system to perform operations comprising: receiving an abstract system definition for an autonomous vehicle system and a target failure rate, the abstract system definition comprising a function to be implemented by the autonomous vehicle system, an input associated with the function, and an output associated with the function; identifying a plurality of components capable of performing at least a portion of the function; generating an initial system design based at least in part on the abstract system definition and a subset of the plurality of components; determining that a failure rate for the initial system design is greater than or equal to a target failure rate; modifying the initial system design based at least in part on the plurality of components to generate a modified system design; determining that a failure rate for the modified system design is less than the target failure rate; and presenting a representation of the modified system design to a user on a display.

B: The system of paragraph A, wherein the plurality of components comprises at least one or more of: a sensor; a computing device; an application; or an interconnection.

C: The system of paragraph A or B, wherein: modifying the initial system design comprises determining a subsequent system design; and determining the subsequent system design comprises executing a genetic algorithm to iteratively modify the initial system design based at least in part on the plurality of components.

D. The system of any of paragraphs A-C, wherein: determining the initial system design comprises generating a plurality of initial system designs, a system design of the plurality of initial system designs determined in accordance with a Monte Carlo technique subject to constraints associated with the plurality of components; and the function comprises safely operating the autonomous vehicle, the input comprises environmental data, and the output comprises a torque to be applied to a wheel.

E: The system of any of paragraphs A-D, wherein modifying the initial system design to generate the modified system design is further based at least in part on a constraint defined in the abstract system definition.

F: The system of any of paragraphs A-E, wherein modifying the system design to generate the modified system design comprises at least one of: adding a sensor; removing a sensor; adding a computing device; removing a computing device; adding an interconnections; or removing an interconnection.

G: A method comprising: receiving an abstract system definition defining a function to be performed by a system; identifying a plurality of components capable of performing at least a portion of the function; determining a system design comprising a subset of the plurality of components capable of performing the at least a portion of the function; determining a fitness value for the system design; iteratively modifying the system design, based at least in part on the fitness value, to generate a modified system design; determining a stopping value based at least in part on a fitness value for the modified system design; and determining that the stopping value meets or exceeds a stopping criteria.

H: The method of paragraph G, wherein iteratively modifying the system design to generate the modified system design comprises: executing a genetic algorithm using the system design as input to the genetic algorithm to determine a subsequent system design; and executing the genetic algorithm using the subsequent system design as input to the genetic algorithm to determine the modified system design.

I: The method of paragraph G or H, wherein the fitness criteria comprise at least one or more of: a reliability criterion indicating a number failures per unit of time; a reliability criterion indicating a mean time between failures; and a performance criteria indicating a processing speed.

J: The method of any of paragraphs G-I, wherein determining the fitness value for the system design comprises: determining a fitness value for individual components of the subset of the plurality of components; and determining the fitness value for the system design based at least in part on the fitness value for individual components of the subset of the plurality of components.

K: The method of any of paragraphs G-J, wherein iteratively modifying the system design comprises determining a subsequent system design comprising at least a portion of the subset of the plurality of components.

L: The method of any of paragraphs G-K, wherein identifying the plurality of components capable of performing at least a portion of the function comprises: determining a first subset of the plurality of components based at least in part on the abstract system definition; and determining a second subset of the plurality of components capable of combining with one of the first subset of the plurality of components.

M: The method of any of paragraphs G-L, wherein: the abstract system definition further defines a constraint associated with the function; and identifying the plurality of components capable of performing at least the portion of the one or more function is based at least in part on the constraint.

N: The method of any of paragraphs G-M, further comprising generating a graph based at least in part on the function; wherein determining the system design comprises mapping the subset of the plurality of components to the graph.

O: One or more computer-readable media storing instructions that, when executed by one or more processors, perform operations comprising: identifying a plurality of components capable of performing at least a portion of a function defined in an abstract system definition, the abstract system definition comprising a stopping criterion; generating a system design based at least in part on the abstract system definition and the plurality of components; determining that a stopping value based at least in part on a fitness value for the system design does not meet a stopping criterion; generating a modified system design based on the system design; and determining that a stopping value based at least in part on a fitness value for the modified system design meets the stopping criterion.

P: The one or more computer-readable media of paragraph O, wherein the operations further comprise generating a graph based at least in part on the function; wherein generating the system design comprises determining the system design by mapping a subset of the plurality of components to the graph.

Q: The one or more computer-readable media of paragraph O or P, wherein generating the modified system design comprises executing a genetic algorithm using the system design as input to determine the modified system design.

R: The one or more computer-readable media of paragraph Q, wherein the stopping criterion comprises at least one or more of: a number of iterations of a genetic algorithm; a rate of fitness improvement.

S: The one or more computer-readable media of paragraph R, wherein generating the system design is further based at least in part on a component constraint define in the abstract system definition.

T: The one or more computer-readable media of any of paragraphs O-S, wherein the operations further comprise: determining a fitness value for individual components of a subset of the plurality of components associated with the system design; and determining the fitness value for the system design based at least in part on the fitness value for individual components of the subset of the plurality of components.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving an abstract system definition for an autonomous vehicle system and a target failure rate, the abstract system definition comprising a function to be implemented by the autonomous vehicle system, an input associated with the function, and an output associated with the function;
generating a graph based at least in part on the function;
identifying a plurality of components capable of performing at least a portion of the function;
generating an initial system design based at least in part on the abstract system definition and a subset of the plurality of components by mapping the subset of the plurality of components to the graph;
determining that a failure rate for the initial system design is greater than or equal to a target failure rate;
modifying the initial system design based at least in part on the plurality of components to generate a modified system design;
determining that a failure rate for the modified system design is less than the target failure rate; and
presenting a representation of the modified system design to a user on a display.

2. The system of claim 1, wherein the plurality of components comprises one or more of:
a sensor;
a computing device;
an application; or
an interconnection.

3. The system of claim 1, wherein:
modifying the initial system design comprises determining a subsequent system design; and
determining the subsequent system design comprises executing a genetic algorithm to iteratively modify the initial system design based at least in part on the plurality of components.

4. The system of claim 1, wherein:
determining the initial system design comprises generating a plurality of initial system designs, a system design of the plurality of initial system designs determined in accordance with a Monte Carlo technique subject to constraints associated with the plurality of components; and
the function comprises safely operating an autonomous vehicle, the input comprises environmental data, and the output comprises a torque to be applied to a wheel.

5. The system of claim 1, wherein modifying the initial system design to generate the modified system design is further based at least in part on a constraint defined in the abstract system definition.

6. The system of claim 1, wherein modifying the initial system design to generate the modified system design comprises at least one of:
adding a sensor;
removing a sensor;
adding a computing device;
removing a computing device;
adding an interconnections; or
removing an interconnection.

7. A method comprising:
receiving an abstract system definition defining a function to be performed by a system;
generating a graph based at least in part on the function;
identifying a plurality of components capable of performing at least a portion of the function;
determining a system design comprising a subset of the plurality of components capable of performing the at least a portion of the function by mapping the subset of the plurality of components to the graph;

determining a fitness value for the system design;

iteratively modifying the system design, based at least in part on the fitness value, to generate a modified system design;

determining a stopping value based at least in part on a fitness value for the modified system design; and determining that the stopping value meets or exceeds a stopping criteria.

8. The method of claim 7, wherein iteratively modifying the system design to generate the modified system design comprises:

executing a genetic algorithm using the system design as input to the genetic algorithm to determine a subsequent system design; and executing the genetic algorithm using the subsequent system design as input to the genetic algorithm to determine the modified system design.

9. The method of claim 7, wherein the fitness value comprises one or more of:

a reliability criterion indicating a number failures per unit of time;

a reliability criterion indicating a mean time between failures; or a performance criteria indicating a processing speed.

10. The method of claim 7, wherein determining the fitness value for the system design comprises:

determining a fitness value for individual components of the subset of the plurality of components; and determining the fitness value for the system design based at least in part on the fitness value for individual components of the subset of the plurality of components.

11. The method of claim 7, wherein iteratively modifying the system design comprises determining a subsequent system design comprising at least a portion of the subset of the plurality of components.

12. The method of claim 7, wherein identifying the plurality of components capable of performing the at least a portion of the function comprises:

determining a first subset of the plurality of components based at least in part on the abstract system definition; and determining a second subset of the plurality of components capable of combining with one of the first subset of the plurality of components.

13. The method of claim 7, wherein:

the abstract system definition further defines a constraint associated with the function; and identifying the plurality of components capable of performing the at least a portion of the function is based at least in part on the constraint.

14. The method of claim 13, wherein iteratively modifying the system design to generate the modified system design is based at least in part on the constraint.

15. One or more computer-readable media storing instructions that, when executed by one or more processors, perform operations comprising:

identifying a plurality of components capable of performing at least a portion of a function defined in an abstract system definition, the abstract system definition comprising a stopping criterion;

generating a graph based at least in part on the function;

generating a system design based at least in part on the abstract system definition and the plurality of components by mapping a subset of the plurality of components to the graph;

determining that a stopping value based at least in part on a fitness value for the system design does not meet a stopping criterion;

generating a modified system design based on the system design; and determining that a stopping value based at least in part on a fitness value for the modified system design meets the stopping criterion.

16. The one or more computer-readable media of claim 15, wherein at least one of the fitness value for the system design or the fitness value for the modified system design represents one or more of a failure rate or a performance attribute.

17. The one or more computer-readable media of claim 15, wherein generating the modified system design comprises executing a genetic algorithm using the system design as input to determine the modified system design.

18. The one or more computer-readable media of claim 17, wherein the stopping criterion comprises one or more of:

a number of iterations of a genetic algorithm; or a rate of fitness improvement.

19. The one or more computer-readable media of claim 18, wherein generating the system design is further based at least in part on a component constraint define in the abstract system definition.

20. The one or more computer-readable media of claim 15, wherein the operations further comprise:

determining a fitness value for individual components of a subset of the plurality of components associated with the system design; and determining the fitness value for the system design based at least in part on the fitness value for individual components of the subset of the plurality of components.

* * * * *